US011059532B1

(12) United States Patent
Fay et al.

(10) Patent No.: US 11,059,532 B1
(45) Date of Patent: Jul. 13, 2021

(54) CONTROL OF ROBOTIC DEVICES WITH NON-CONSTANT BODY PITCH

(71) Applicant: Boston Dynamics, Inc., Waltham, MA (US)

(72) Inventors: Gina Christine Fay, Waltham, MA (US); Alex Yu Khripin, Waltham, MA (US); Eric Whitman, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 392 days.

(21) Appl. No.: 16/046,510

(22) Filed: Jul. 26, 2018

Related U.S. Application Data

(63) Continuation of application No. 15/193,273, filed on Jun. 27, 2016, now Pat. No. 10,059,392.

(51) Int. Cl.
*B62D 57/032* (2006.01)

(52) U.S. Cl.
CPC .................. *B62D 57/032* (2013.01)

(58) Field of Classification Search
CPC ...... B62D 57/032; B62D 57/02; B25J 9/1605; B25J 9/163; B25J 9/1633; G05B 2219/39322; G05B 2219/39329; G05B 2219/39333; G05B 2219/39337; G05B 2219/40525; Y10S 901/01
USPC .......... 701/23; 700/250, 260; 901/1; 318/568.12, 568.17, 568.18
See application file for complete search history.

(56) References Cited

U.S. PATENT DOCUMENTS 6,330,494 B1 * 12/2001 Yamamoto ............. B25J 9/1674
700/261
9,089,968 B2 7/2015 Goulding
2014/0195094 A1 7/2014 Popa et al.

FOREIGN PATENT DOCUMENTS

JP 2001310278 A 11/2001
WO 2008084480 A2 7/2008

OTHER PUBLICATIONS

Karydis et al. "Probabilistic Validation of a Stochastic Kinematic Model for an Eight-legged Robot," 2013 IEEE International Conference on Robotics an Automation (ICRA), Karisruhe, Germany, May 6-10, 2013, pp. 2547-2552.

* cited by examiner

*Primary Examiner* — Bao Long T Nguyen
(74) *Attorney, Agent, or Firm* — Honigman LLP; Brett A. Krueger

(57) ABSTRACT

An example implementation involves controlling robots with non-constant body pitch and height. The implementation involves obtaining a model of the robot that represents the robot as a first point mass rigidly coupled with a second point mass along a longitudinal axis. The implementation also involves determining a state of a first pair of legs, and determining a height of the first point mass based on the model and the state of the first pair of legs. The implementation further involves determining a first amount of vertical force for at least one leg of the first pair of legs to apply along a vertical axis against a surface while the at least one leg is in contact with the surface. Additionally, the implementation involves causing the at least one leg of the first pair of legs to begin applying the amount of vertical force against the surface.

20 Claims, 9 Drawing Sheets

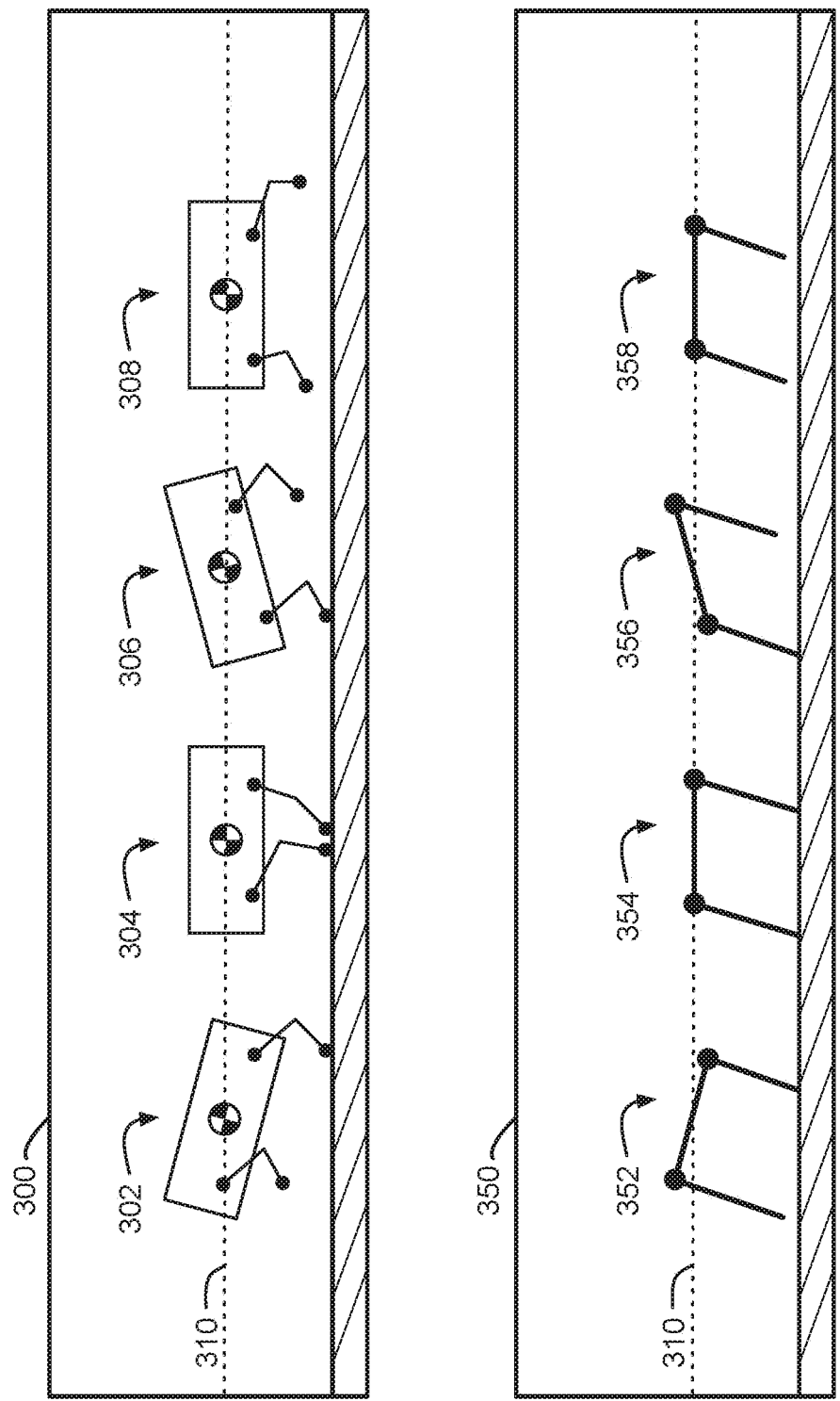

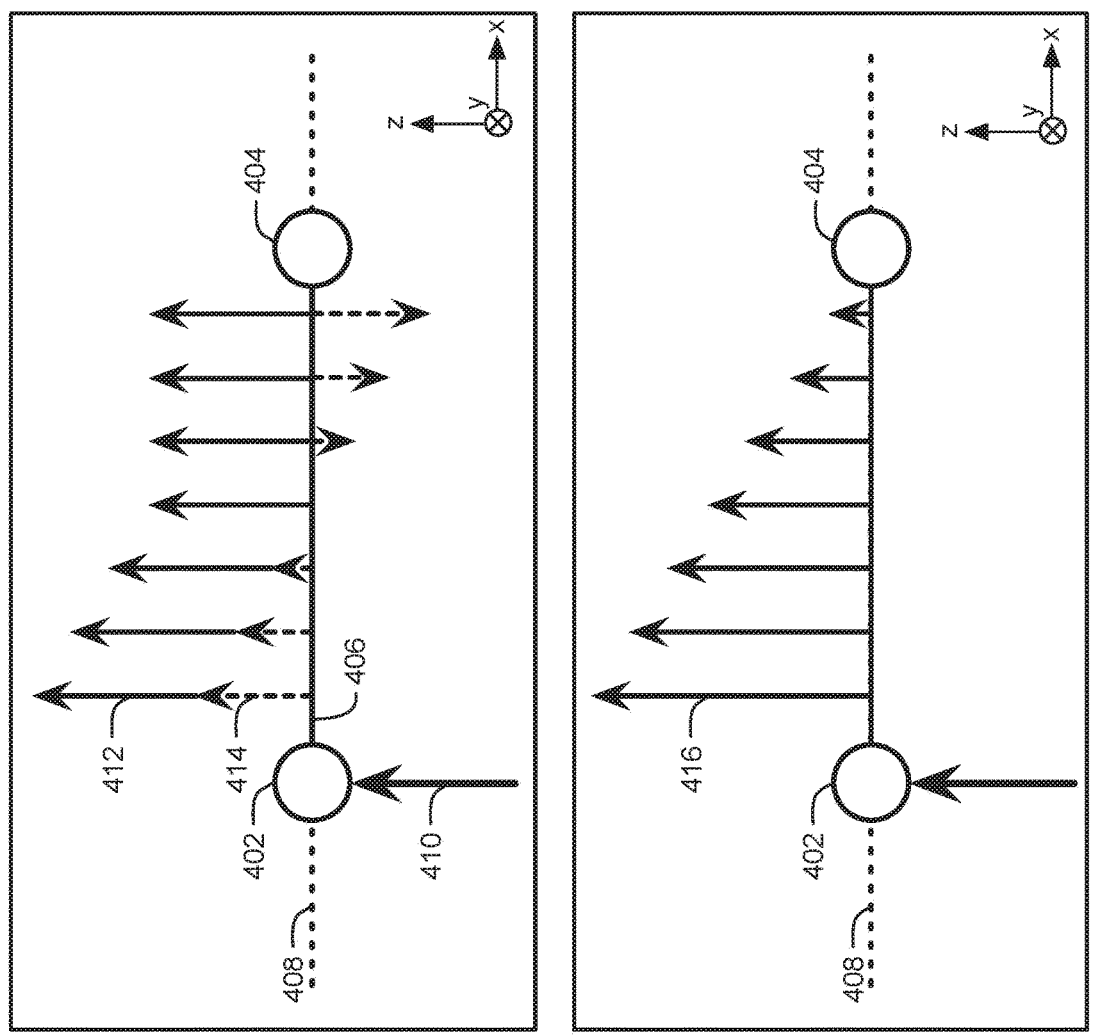

CONTROL OF ROBOTIC DEVICES WITH NON-CONSTANT BODY PITCH

CROSS REFERENCE TO RELATED APPLICATIONS

This U.S. patent application is a continuation of, and claims priority under 35 U.S.C. § 120 from, U.S. patent application Ser. No. 15/193,273, filed on Jun. 27, 2016. The disclosure of this prior application is considered part of the disclosure of this application and is hereby incorporated by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

The present application discloses implementations that relate to kinematic control of robots with non-constant body pitch and height. One example involves obtaining a model of a quadruped robot that represents the quadruped robot as a first point mass rigidly coupled with a second point mass along a longitudinal axis. The first point mass is associated with a first pair of legs of the robot and the second point mass is associated with a second pair of legs of the robot. Force applied along the longitudinal axis at the first point mass is experienced at the second point mass. Force applied along a vertical axis at the first point mass generally does not affect a height of the second point mass. The example also involves determining a state of a first pair of legs. The example further involves determining a height of the first point mass based on the model and the state of the first pair of legs. Additionally, the example involves determining, by a first height controller for the first point mass, a first amount of vertical force for at least one leg of the first pair of legs to apply along the vertical axis against a surface while the at least one leg is in contact with the surface. Further, the example includes causing the at least one leg of the first pair of legs to begin applying the first amount of vertical force against the surface.

Another example describes a robot. The robot includes a first pair of legs, a second pair of legs, and a control system. The control system is configured to perform a set of operations. The operations include obtaining a model of the robot that represents the robot as a first point mass rigidly coupled with a second point mass along a longitudinal axis. The first point mass is associated with the first pair of legs of the robot and the second point mass is associated with the second pair of legs of the robot. Force applied along the longitudinal axis at the first point mass is experienced at the second point mass. Force applied along a vertical axis at the first point mass generally does not affect a height of the second point mass. The operations also include determining a state of a first pair of legs. The operations further include determining a height of the first point mass based on the model and the state of the first pair of legs. Additionally, the operations include determining, by a first height controller for the first point mass, a first amount of vertical force for at least one leg of the first pair of legs to apply along the vertical axis against a surface while the at least one leg is in contact with the surface based on the state of the first pair of legs and the height of the first point mass. Further, the operations include causing the at least one leg of the first pair of legs to begin applying the first amount of vertical force against the surface.

In still another example, the present application describes a non-transitory computer-readable medium having instructions stored thereon that, upon execution by at least one processor, causes a quadruped robot to perform a set of operations. The operations include obtaining a model of the quadruped robot that represents the quadruped robot as a first point mass rigidly coupled with a second point mass along a longitudinal axis. The first point mass is associated with a first pair of legs of the robot and the second point mass is associated with a second pair of legs of the robot. Force applied along the longitudinal axis at the first point mass is experienced at the second point mass. Force applied along a vertical axis at the first point mass generally does not affect a height of the second point mass. The operations also include determining a state of a first pair of legs. The operations further include determining a height of the first point mass based on the model and the state of the first pair of legs. Additionally, the operations include determining, by a first height controller for the first point mass, a first amount of vertical force for at least one leg of the first pair of legs to apply along the vertical axis against a surface while the at least one leg is in contact with the surface based on the state of the first pair of legs and the height of the first point mass. Further, the operations include causing the at least one leg of the first pair of legs to begin applying the first amount of vertical force against the surface.

In yet another example, the present application describes a system. The system includes a means for obtaining a model of a quadruped robot that represents the quadruped robot as a first point mass rigidly coupled with a second point mass along a longitudinal axis. The first point mass is associated with a first pair of legs of the robot and the second point mass is associated with a second pair of legs of the robot. Force applied along the longitudinal axis at the first point mass is experienced at the second point mass. Force applied along a vertical axis at the first point mass generally does not affect a height of the second point mass. The system also includes a means for determining a state of a first pair of legs. The system further includes a means for determining a height of the first point mass based on the model and the state of the first pair of legs. Additionally, the system includes a means for determining, by a first height controller for the first point mass, a first amount of vertical force for at least one leg of the first pair of legs to apply along the vertical axis against a surface while the at least one leg is in contact with the surface based on the state of the first pair of legs and the height of the first point mass. Further, the system includes a means for causing the at least one leg of the first pair of legs to begin applying the first amount of vertical force against the surface.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DESCRIPTION OF DRAWINGS

FIG. 3 is a conceptual illustration of a model of a robot, according to an example implementation.

FIG. 4A is a conceptual illustration of a model of a robot, according to an example implementation.

Like reference symbols in the various drawings indicate like elements.

DETAILED DESCRIPTION

Figure 1:
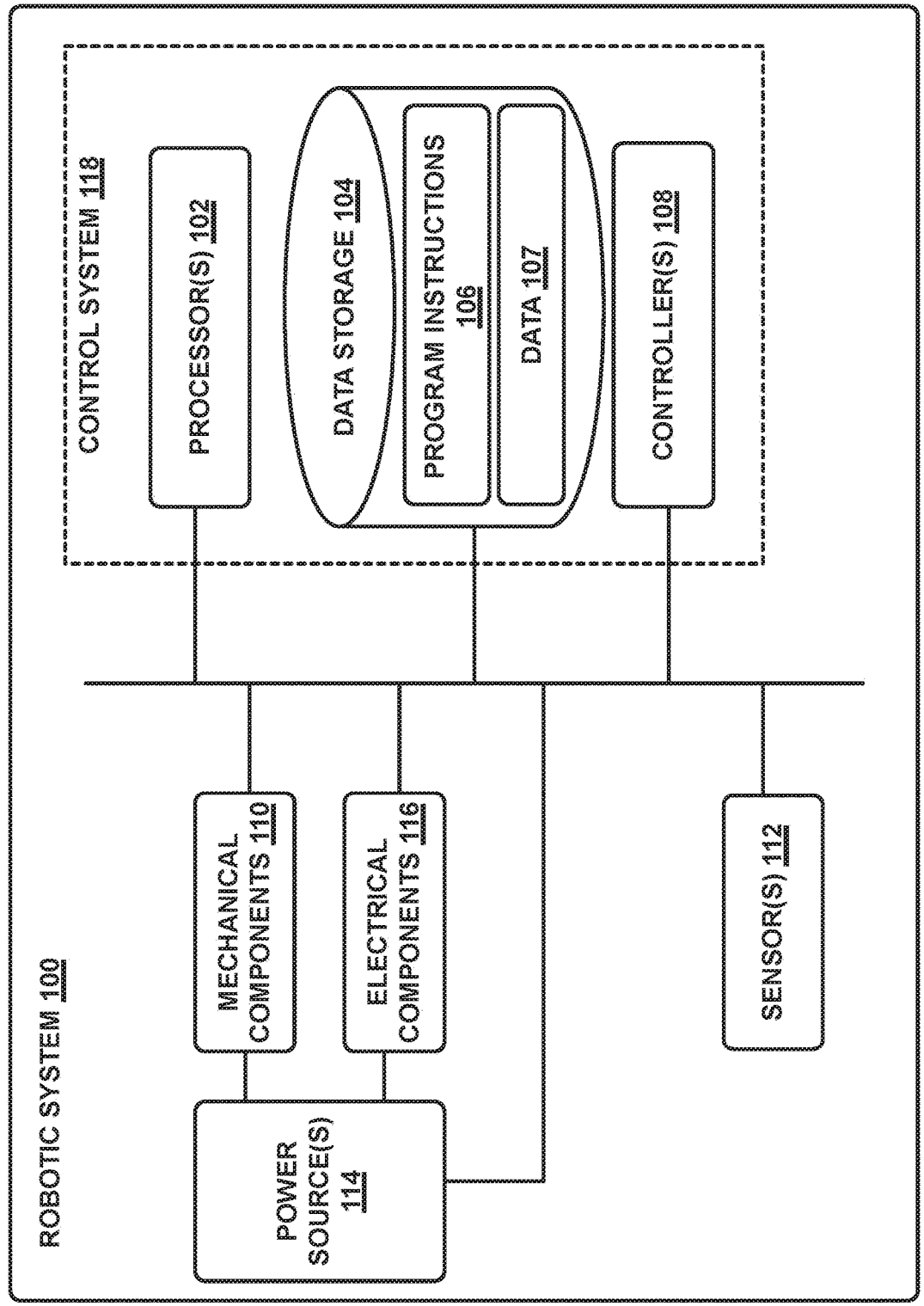
FIG. 1 illustrates a configuration of a robotic system, according to an example implementation.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

The present application discloses implementations that relate to kinematic control of robots with non-constant body pitch and height. A quadruped robot, for example, might be configured to operate according to different gaits. Some gaits—such as standing, walking, or trotting—may maintain an approximately constant body pitch. Other gaits—such as running, galloping, or bounding—might cause the robot's body pitch to vary over time.

Changing body pitch can affect the height of certain portions of the robot differently. For example, if the robot is pushing off with its rear legs during a bounding operation, the rear legs may compress and lower the rear end of the robot while the front of the robot rises. Such height fluctuations can increase the complexity of robotic control, since the height is no longer constant throughout the robot's body.

Implementations disclosed herein involve utilizing a robot model that decouples height control different pairs of legs of the robot. For a quadruped robot, an example model may be a "barbell" model that represents the quadruped robot as two separate point masses rigidly coupled to each other, with one point mass is associated with the front pair of legs and the other point mass is associated with the rear pair of legs. Using this model, height control of the front legs may be decoupled from the height control of the rear legs. In this manner, other controllers for the robot (e.g., gait controllers, footstep location planners, steering controllers, etc.) can operate independently from height controllers, without having to be modified or configured specifically to account for changing height and/or pitch of the robot.

A height controller associated with a pair of legs may, in some instances, determine the height of the point mass associated with that pair of legs based on the kinematic state of the robot. A feedback loop or other control mechanism may then determine an amount of force for the legs to apply to adjust the height in accordance with a particular control goal. For example, if a control goal is to maintain a target height, then the control system may determine to apply an amount of force for the legs to apply in order to adjust the height to the target height. Other control goals—constant or time-varying—may be possible.

Once an amount of force is determined, the control system may cause the legs of the robot to begin applying that force against a surface, such as a ground surface. In some implementations, the force may vary over time, such that the net application of the force against the surface adjusts the height to a target height. The amount of force may be a vertical component of force, such that the legs apply a force against the surface with a vertical component (for height control) and a horizontal component (e.g., for roll control).

In some implementations, height controllers for the front and rear legs may operate independently from one another. Put differently, one height controller may determine the amount of force to apply by the front legs against a surface to control the height of the front point mass, which may generally be positioned above the front pair of legs (e.g., at or near the connection between the front pair of legs and the robot's body). Similarly, different height controller (independent from the height controller for the front legs) may determine the amount of force to apply by the rear legs against the surface to control the height of the rear point mass, which may generally be positioned above the rear pair of legs (e.g., at or near the connection between the rear pair of legs and the robot's body).

Control of a multi-legged robot may involve height (vertical) control, pitch control, roll control, and translational (e.g., lateral, longitudinal, and yaw motion) control. Collectively, these different aspects of control form six degrees of freedom (DOF). Height control may involve determining an amount of force for the robot's legs to apply against a surface (where greater force raises the height of that part of the robot, and lower force lowers the height of that part of the robot). Pitch control may be the result of height control, since the pitch may represent a height differential between two points (e.g., an angle of the body with respect to the ground surface). Roll control may involve applying lateral foot forces against a surface by the legs of the robot. Translational motion may involve footstep planning, which may incorporate target foot touchdown locations and/or timing to carry out a particular gait, move along a particular trajectory, and/or move at a particular velocity.

In some implementations, a robotic control system may obtain a "template" footstep sequence and modify it based on the robot's state and the particular controllers in effect during operation. A template footstep sequence may include predetermined footstep locations, predetermined timing for the robot to step to those footstep locations, and/or predetermined force values for each footstep among other possible aspects of footsteps. The robotic control system may determine a manner in which to modify aspects of the template footstep sequence. For example, a height controller may determine that the predetermined force value for a footstep is sufficient to maintain a desired or target height, and may increase the force value accordingly. Such modifications may be made to the lateral positions of the footstep locations, the longitudinal positions of the footstep locations, the amount of vertical force to apply at the footstep locations, the amount of lateral or longitudinal force to apply at those footstep locations, and/or the timing of the footsteps.

A legged robot may include one or more controllers that drive the legged robot's actuators. As described to herein, a "controller" may refer to a control configuration and parameters that, when applied to a control system that operates the robot's actuators, causes the robot to perform a particular action, carry out an operation, or act in accordance with a particular behavior. In some implementations, a controller might operate the robot's actuators to effect a certain gait (e.g., walk, trot, run, bound, gallop, etc.), maintain a certain condition (e.g., maintain balance, height, velocity, etc.), or some combination thereof. One or more controllers may be activated at a given time, each of which controls (or contributes to controlling) actuators on the robot to accomplish its particular task.

Although the above-described example involves a quadruped robot and a barbell model, any robot having any number of legs may be modeled using any number of point masses connected to each other in various ways. The barbell model of a quadruped robot is one example in which multiple, independent height controllers can be employed for different portions of the robot. Other robot configurations may be represented by models having any number of point masses rigidly connected to each other in various ways, such that the height of each point mass can be independently controlled without affecting the heights of the other point masses. The scope of the present application is not limited to barbell models, and includes other models that allow for independent height control.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
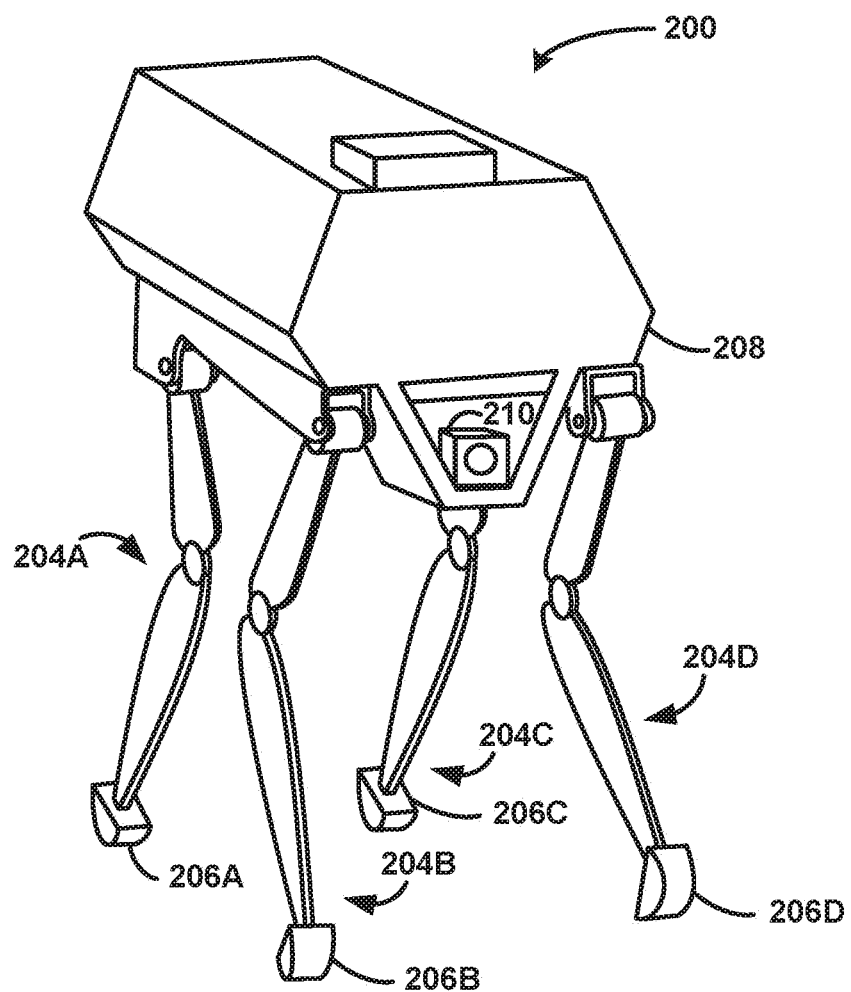
FIG. 2 illustrates a perspective view of a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

III. EXAMPLE ROBOT MODELS

FIG. 3 is a conceptual illustration of a model of a robot, according to an example implementation. In frame 300, a running robot is illustrated in four different states at four respective points in time. At state 302, the robot lands on its front legs, with its body pitched forward. At state 304, the robot's rear legs touch down and the body pitch is level. At state 306, the robot's rear legs remain planted while the front legs lift upwards, resulting in a rear-leaning body pitch. At state 308, the robot is in "flight" with no feet in contact with the ground and a level body pitch. States 302-308 may repeat any number of times to carry out a running gait.

Note that the robot's center of mass—illustrated by a checkered circle in FIG. 3—stays relatively level across states 302-308. Sensors coupled to this portion of the robot's body might not accurately measure the height of the front and rear portions of the robot. Thus, height control using a simple model, such as a LIP model, may not effectively account for changes in body pitch.

In frame 350, a model of the robot is depicted in four different states corresponding to states 302-308, respectively. In this example, the model is a barbell model that includes two point masses rigidly coupled to each other by a massless pole. Although the legs are also illustrated in frame 350, they might or might not be included in the model of the robot, depending upon the particular implementation.

At state 352 (corresponding to state 302 in frame 300), the robot's body pitch is downward with respect to the direction of motion. At state 354 (corresponding to state 304 in frame 300), the robot's body pitch is level. At state 356 (corresponding to state 306 in frame 300), the robot's body pitch is upward. At state 358 (corresponding to state 308 in frame 300), the robot's body pitch is level.

As shown in FIG. 3, a body pitch of the robot affects the height of the front and rear portions of the robot. Such height differences—when unaccounted for—could adversely impact other aspects of robotic control. For example, if the robot is pitched back and is instructed to step to a particular footstep location (defined by relative lateral and longitudinal positions with respect to the robot's current position), the robot might not extend its front legs enough to make contact with the ground surface since its front legs are high off the ground.

FIG. 4A is a conceptual illustration of a model of a robot, according to an example implementation. In this example, a quadruped robot is modeled as a barbell that includes a first point mass 402 and a second point mass 404 rigidly coupled to each other with a massless pole 406 along a longitudinal axis 408. FIG. 4A and the following description illustrates how vertical forces applied at one point mass in the barbell model generally does not impact the height of the other point mass.

Note that, for the example in FIG. 4A, the longitudinal axis is the x-axis, a lateral axis is the y-axis, and the vertical axis is the z-axis. "Longitudinal" refers to the axis defined by the two point masses in the barbell model (e.g., an axis passing from the rear legs to the front legs of a quadruped robot). Additionally, as described herein, "pitch" refers to rotation about the lateral axis, "roll" refers to rotation about the longitudinal axis, and "yaw" refers to rotation about the vertical axis.

In FIG. 4A, a vertical force 410 is applied in the positive z-direction at point mass 402. As a result, two main force components act on the barbell model: the upwards force 412 resulting from the vertical force 410, and a rotational torque 414 resulting from the application of force at one end of the barbell (i.e., an angular moment due to the inertia of the point mass 404). When combined, the upwards force 412 and the rotational torque 414 form a net force 416 on the barbell model. If the point masses 402 and 404 are of equal mass, then the net force 416 is zero at point mass 404. Thus, the height (i.e., the z-axis position) of point mass 404 is unaffected by z-directional forces acting on the point mass 402.

As shown by the force diagram on the barbell model, vertical forces applied at one point mass of the barbell model do not affect the height of the other point mass of the barbell model. In the context of the quadruped robot, the vertical force applied at the point mass is the net z-direction force experienced at the point mass resulting from the legs pushing against a surface.

Although the present disclosure describes a barbell model in which vertical forces applied at one point mass do not affect the height of the other point mass, it should be understood that complete height control decoupling may not necessarily be achieved in various circumstances. Examples herein generally describe ideal examples in which a robot is perfectly modelled. However, real-world limitations may result in barbell models which approximately represent a robot, but may not be absolutely precise. In such circumstances, vertical forces applied against one point mass may produce a negligible acceleration at the other point mass. Such imperfect or approximate robot models may be used by control systems without departing from the scope of the present disclosure.

Figure 4B:
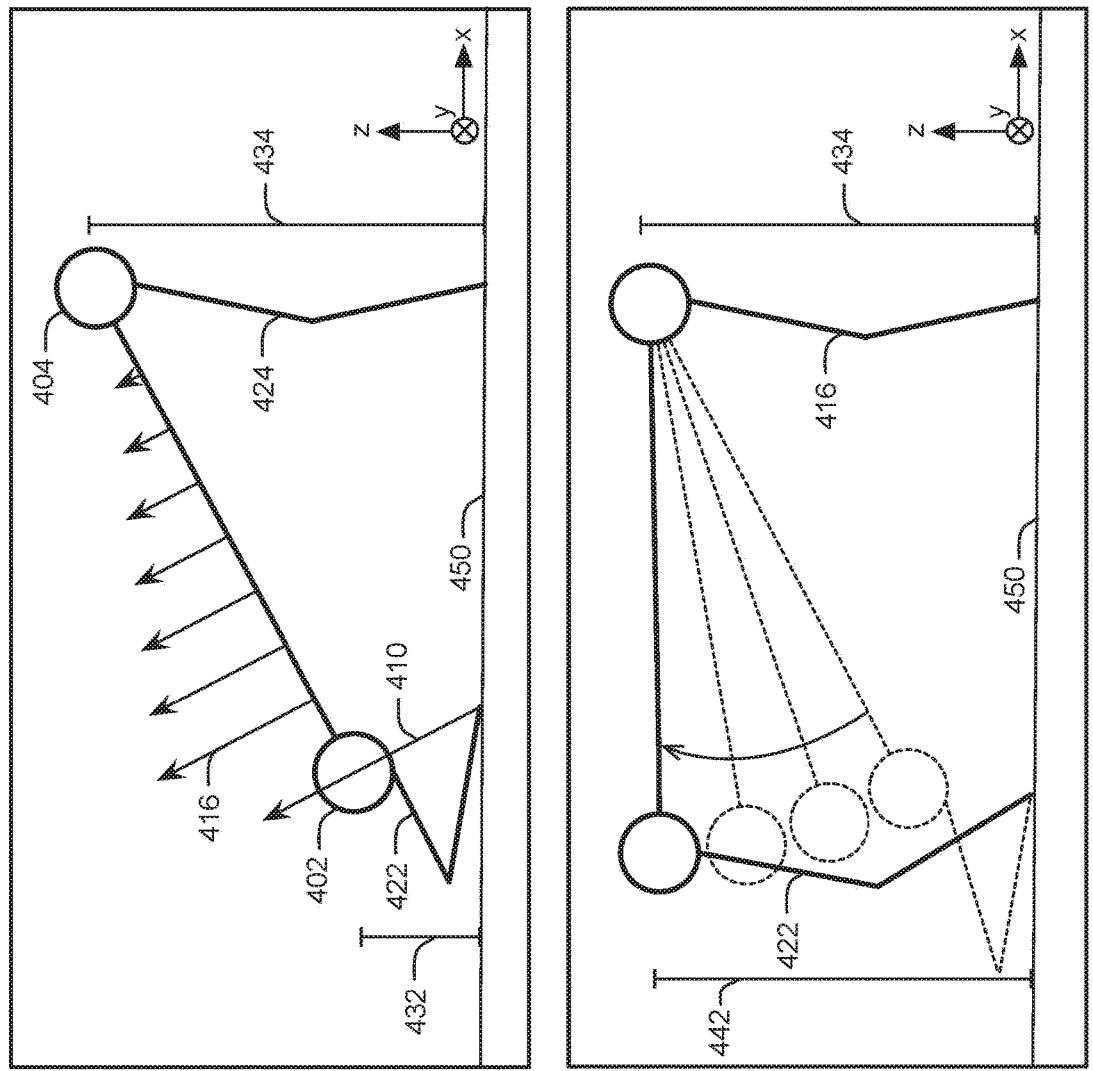
FIG. 4B is a conceptual illustration of a model of a robot, according to an example implementation.

FIG. 4B illustrates how a vertical force 410 applied at the first point mass 402 affects the heights of the first point mass 402 and the second point mass 404. In this example, the first point mass 402 is initially at height 432 and the second point mass 404 is initially at height 434. The first pair of legs 422 press against the ground surface 440, which exerts a force 410 at the point mass 402. This produces the net force 416 along the body of the robot. Because the rotational acceleration and the vertical acceleration cancel out at the second point mass 404, the second point mass 404 experiences no net vertical force. For the following example, the second pair of legs 424 exert a force that is equal to the force of gravity acting on the second point mass, such that the second point mass 404 experiences no net acceleration.

The force 410 causes the first point mass 402 to begin rising (moving in the positive z-direction). Because the magnitude of acceleration decreases from the first point mass 402 to the second point mass 404, the first point mass 402 effectively rotates about the second point mass 404 (which remains stationary at a constant height with respect to the ground surface 450). Once the force exerted by legs 422 is equal to the force of gravity acting on the first point mass 402, the first point mass 402 reaches height 442, while the second point mass 404 remains at height 434.

As illustrated in this example, a height controller for the first point mass 402 (which may control an amount of force for the legs to exert against the ground surface 440), generally does not affect the height of the second point mass 404 (and vice versa). In this manner, the footstep forces to exert by the first pair of legs 422 can be determined independently from the footstep forces to exert by the second pair of legs 424. A benefit of this configuration is that the complexity of height control can be reduced (e.g., since fewer parameters apply to a given height controller). When simplified, leg force determinations can occur in a shorter amount of time and be performed more frequently, improving the performance of height control and allowing a control device to respond more rapidly to changes in the robot's height.

Note that, in the example depicted in FIG. 4B, the "vertical" force is a force with a direction that is normal to a plane defined by the lateral and longitudinal axes. As described herein, the "vertical force" may refer to a force along an axis defined by the orientation of the robot's body. In some instances, the direction of the vertical force may be approximately aligned with the z-axis as illustrated in FIG. 4B (e.g., an axis defined by the direction of gravity).

IV. EXAMPLE CONTROL SYSTEMS

Instructing a legged robot to behave according to complex behaviors may involve determining various aspects of the robotic control—such as the footstep forces, location, and timing—in multiple stages. In some instances, a particular stage may depend upon one or more presumptions (e.g., that the body height is uniform between the front and rear legs of a quadruped robot, that the footstep timing has been adjusted to account for changes in ground elevation, etc.). Thus, some control systems may decompose robotic control tasks into separate, independent control objectives. By decoupling these control tasks, each controller may be simplified, improving the execution speed and robustness of the controllers.

In some implementations, robotic control of quadruped robots having "pitchy" gaits—that is, stepping patterns or behaviors that cause the robot's body pitch to change over time—may involve separate height control, roll control, longitudinal footstep location control, lateral footstep location control, and yaw control, among other types of control. Height control may involve maintaining the height of the robot's body through the application of vertical force to the ground by the robot's legs. Similarly, roll control may involve applying horizontal forces against the ground to prevent the robot from tipping over. Footstep location control may involve any combination of footstep planning and near-real time adjustments to footsteps based on the robot's kinematic state. Yaw control may involve trajectory planning, steering control, and/or obstacle avoidance.

In some implementations, a control system receives a "template" footstep sequence and may adjust aspects of that template footstep sequence based on the state of the robot. The template footstep sequence may include a combination of force values, timing information, and/or locations for one or more planned future footsteps of a robot. Aspects of the template footstep sequence may be modified by one or more controllers within the control system based on the state of the robot, control commands, and/or environmental conditions. As described herein, the "template" footstep sequence may also be referred to as a footstep "tape" or a "predetermined" footstep sequence.

As one example, a control system may initially receive a template footstep sequence and the state of a robot. Then, the control system may modify the force values in the template footstep sequence and/or the timing of the footsteps in the template footstep sequence based on the state of the robot. The modified footstep sequence may then be used as a basis for determining footstep locations for the robot. In some implementations, lateral footstep displacement (e.g., "stepout" locations) may be determined independent from longitudinal footstep displacement. Lateral footstep displacement may be selected to maintain stability of the robot and/or based on a steering command or predetermined trajectory. Longitudinal footstep displacement may be selected based at least on a target velocity for the robot. Collectively, the longitudinal footstep displacements and lateral footstep displacements define planar footstep locations for the robot.

In the above-described example, determining footstep locations may depend upon footstep force values and timing. Thus, the robotic control determinations may be decomposed into multiple stages: force value determination, timing determination, and footstep location determination. Each of these stages may also be separated into multiple parts (e.g., separate vertical and horizontal force determinations, separate determination of front leg force values and rear leg force values, separate determination of force values for each leg within a pair of legs, etc.).

A multi-stage control system, such as the one described above, may determine aspects of control for the front legs and the rear legs independently. For example, the barbell model for a quadruped robot may couple longitudinal control and decouple lateral and vertical control. Forces applied in the longitudinal direction affect the entire body (e.g., the positions of the front and rear legs in the longitudinal direction). However, forces applied in the lateral direction or the vertical direction may not affect the entire body. For instance, vertical forces applied through a point mass of the barbell model affects the height of that point mass, but not the height of the other point mass. Thus, some stages of a multi-stage control system may involve two or more independent and parallel control stages (e.g., independent height control for front legs and height control for rear legs).

Note that, as described herein, a "gait" may refer to a stepping behavior of a robot. Some example gaits include walking, trotting, galloping, and bounding, among other possible gaits. A gait may define the template footstep sequence and the footstep location determinations, for example. For instance, a walking gait may involve alternate stepping by two legs of a quadruped robot while maintaining a level body pitch (with respect to the ground or the surface upon which the robot is stepping). As another example, a galloping gait may involve four steps in quick succession by the four legs of a quadruped robot, followed by a flight period where all legs of the robot are in the air while the body of the robot has a non-constant body pitch.

In some implementations, the height controllers of a control system may regulate the height of the robot independently from the gait of the robot. A height controller may determine vertical force values for the robot's legs to apply against a surface. Any gait controller may then receive the footstep force values and determine footstep locations in accordance with the stepping behavior defined by that gait controller. Thus, one height controller may be utilized across multiple gait controllers, allowing the gait controllers to be interchanged during operation without having to alter the height controller. In some instances, such an arrangement may allow a robot to transition between gaits (e.g., from walking to galloping) without having to explicitly account for transitions between constant body pitch behaviors and non-constant body-pitch behaviors.

Figure 5:
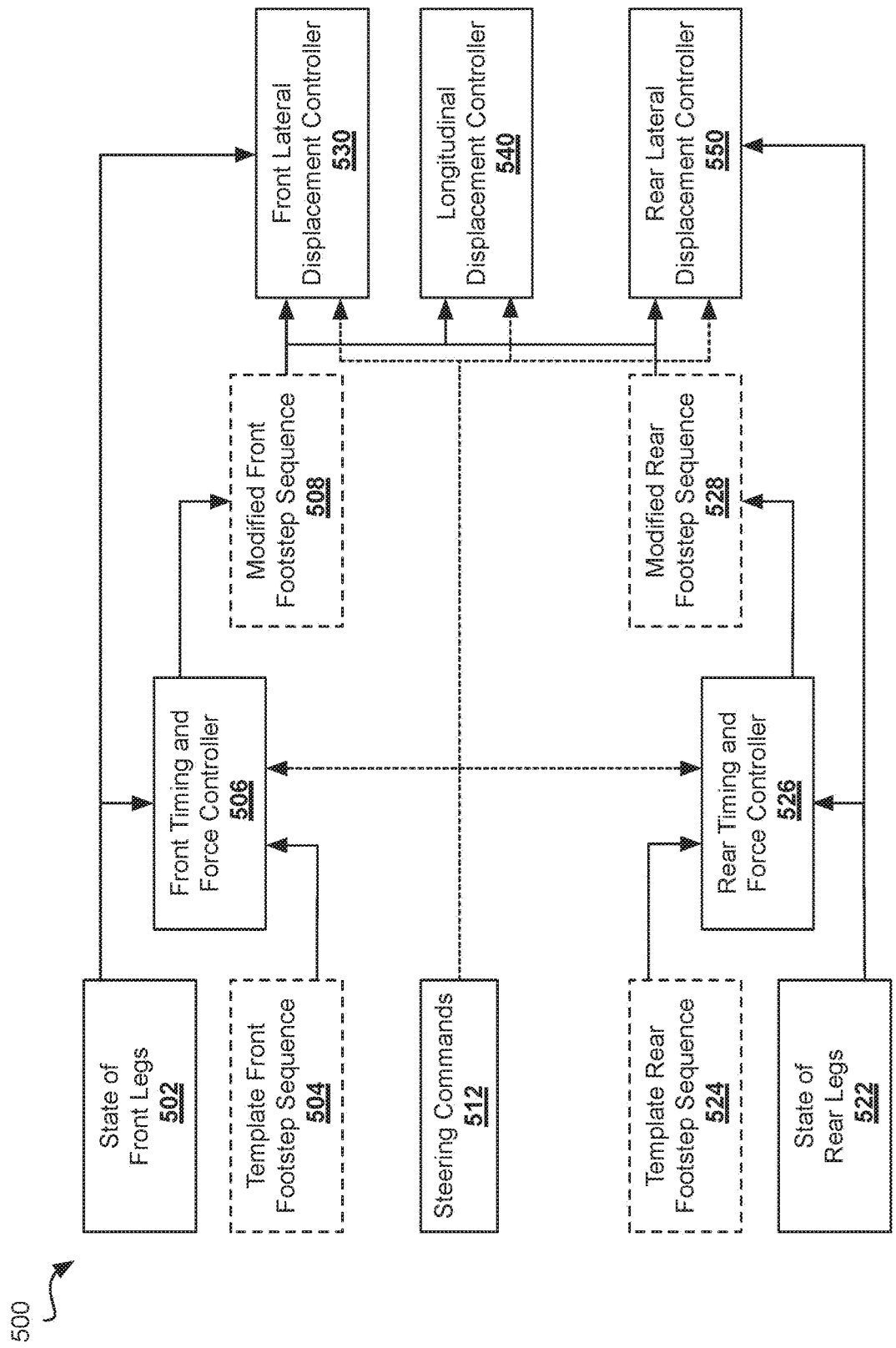
FIG. 5 is a schematic block diagram of a control system, according to an example implementation.

FIG. 5 is a schematic block diagram of a control system 500, according to an example implementation. In control system 500, the state of the front legs 502 and a template front footstep sequence 504 are provided to the front timing and force controller 506, which outputs a modified front footstep sequence 508. Similarly, the state of the rear legs 522 and a template rear footstep sequence 524 are provided to the rear timing and force controller 526, which outputs a modified rear footstep sequence 528. The modified front footstep sequence 508 and the modified rear footstep sequence 528 are then provided as inputs to the front lateral displacement controller 530, the longitudinal displacement controller 540, and the rear lateral displacement controller 550. The control system 500 may then instruct or cause a robot to step in accordance with the footstep force values, timing, and locations determined by controllers 506, 526, 530, 540, and 550.

The state of the front legs 502 may include any information about the movement, pose, forces acting on the front legs, or other kinematic information about the front legs of the robot. In some implementations, the state of the front legs 502 may also include some aspects of the state of the robot's body (e.g., position, velocity, acceleration, angular position, angular velocity, and/or angular acceleration, among other possible information). The state of the front legs 502 may further include the joint angles of the front legs. The state of the rear legs 522 may include the same or similar information for the rear legs.

The template front footstep sequence 504 may include footstep force values, footstep locations, timing, or any combination thereof. The force value for a given footstep may include forces applied along one or more axes (e.g., vertical force, lateral force, and/or longitudinal force), which could be collectively represented as a vector with a magnitude and direction. The timing information may include, for each footstep, a time value relative to a reference time indicating a point in time at which to place the robot's foot onto a surface. The timing information may also include the duration for each footstep (e.g., a period of time from touchdown to lift-off). In some instances, the template front footstep sequence 504 may define footstep locations, which each footstep location specifying a lateral displacement and a longitudinal displacement (e.g., a planar coordinate) with respect to the robot's body at a given point in time. Note that, in other implementations, the template front footstep sequence 504 does not include any predetermined footstep locations. The template rear footstep sequence 524 may include the same or similar information for the rear legs.

The front timing and force controller 506 may be any combination of hardware and/or software that modifies the template front footstep sequence 504 based on the state of the front legs 502. In some implementations, front timing and force controller 506 may include two or more separate controllers, such as a timing controller and a vertical force controller. It should be understood that front timing and force controller 506 may represent multiple controllers, and is illustrated as a single block for explanatory purposes.

The front timing and force controller 506 may determine a manner in which to modify the vertical forces of the template front footstep sequence 504. For example, if the state of the front legs 502 indicates that the front portion of the robot's body is lower than a target height, the front timing and force controller 506 may increase the vertical forces for the front legs to increase the height of the front portion of the robot (e.g., toward the target height). Conversely, if the state of the front legs 502 indicates that the front portion of the robot's body is higher than a target height, the front timing and force controller 506 may decrease the vertical forces for the front legs to decrease the height of the front portion of the robot. The front timing and force controller 506 might also determine that no modification of the height values is needed to maintain a target height.

The front timing and force controller 506 may also determine a manner in which to modify the timing of the template front footstep sequence 504. For example, if the elevation of the surface upon which the robot is walking is increasing, the timing of future footsteps may be adjusted (e.g., footsteps may occur sooner than as defined in the template front footstep sequence 504) in order to account for the change in elevation. Conversely, if the elevation of the surface upon which the robot is walking is decreasing, the timing of future footsteps may be adjusted (e.g., footsteps may occur later than as defined in the template front footstep sequence 504) in order to account for the change in elevation. The front timing and force controller 506 might also determine that no modification of the timing is needed.

The front timing and force controller 506 may then output a modified front footstep sequence 508, which may include adjusted timing and/or force values for one or more front leg footsteps. The modified front footstep sequence 508 and the state of the front legs 502 may then be provided to the front lateral displacement controller 530, which may determine the lateral step-out displacement values for the front legs.

The rear timing and force controller 526 may carry out the same or similar operations as the front timing and force controller 506 for the rear legs and rear portion of the robot, which may then output a modified rear footstep sequence 528 similar to the modified front footstep sequence 508. The modified rear footstep sequence 528 and the state of the rear legs 522 may then be provided to the rear lateral displacement controller 550, which may determine the lateral step-out displacement values for the rear legs.

The front lateral displacement controller 530 may determine lateral displacement values for the front legs (e.g., with respect to the robot's body). In some instances, the lateral displacement values may be determined based on a step planner, steering commands 512 (e.g., yaw control), and/or other control goals such as maintaining balance or recovering from a slip. Note that yaw control may involve a coordinate control effort between the lateral displacement of the front legs and the lateral displacement of the rear legs.

In some instances, the modified front leg footstep sequence 508 may be provided to the rear lateral displacement controller 550, and/or the modified rear leg footstep sequence 528 may be provided to the front lateral displacement controller 530. Some control systems may implement yaw control by coordinate footstep displacement across the front and rear legs. It should be understood, however, that the front lateral displacement may be determined independent of the modified rear footstep sequence 528, and that the rear lateral displacement may be determined independent of the modified front footstep sequence 508.

The longitudinal displacement controller 540 may receive the modified front footstep sequence 508 and the modified rear footstep sequence 528 as inputs, and may determine the longitudinal displacement for the front and rear legs. In some implementations, the longitudinal displacement may be applied for both the front and rear legs, since they are coupled longitudinally according to the barbell model.

The front lateral displacement controller 530, the longitudinal displacement controller 540, and the rear lateral displacement controller 550 may then cause the robot to begin stepping in accordance with the force values and timing defined by the modified front footstep sequence 508 at locations defined by the controllers 530, 540, 550. In some implementations, the footstep force values, timing, and locations may be provided to other control systems or computing devices coupled to the robot, which may further modify aspects of the determined control before carrying out the footstep sequence by the robot.

The steering commands 512 may direct the robot to move in a particular fashion or direction. Steering commands 512 may specify a direction and/or velocity for the robot to travel along. The steering commands 512 could be input via a joystick, provided programmatically based on a planned trajectory for the robot to travel along, or otherwise be instructions issued to the robot from other control systems or computing devices. The steering commands 512 may represent instructions to adjust the robot's yaw, step out (lateral) footstep displacement, and/or longitudinal footstep placement (for velocity control). In some instances, no steering commands 512 may be provided, and the robotic control may be based on a predetermined stepping behavior and/or trajectory for the robot. The steering commands 512 may affect the footstep forces, timing, footstep lateral displacement, and/or footstep longitudinal displacement for the front legs and/or rear legs, depending upon the particular steering command.

V. EXAMPLE ROBOTIC DEVICES

Figure 6:
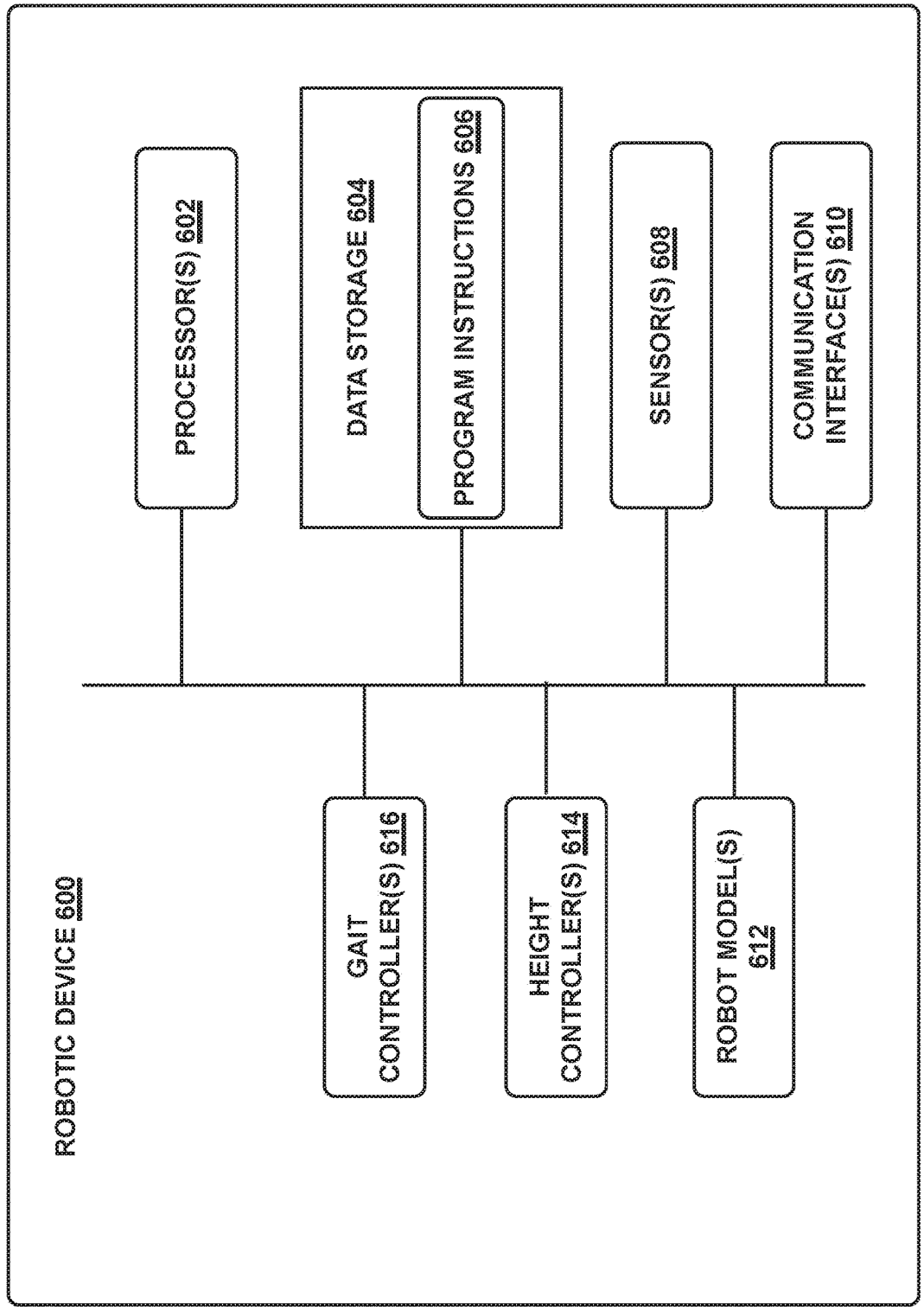
FIG. 6 is a schematic block diagram of a robotic device, according to an example implementation.

FIG. 6 is a schematic block diagram illustrating an example robotic device 600, according to an example implementation. The robotic device 600 includes processor(s) 602 (also referred to as data processing hardware), data storage 604, program instructions 606, sensor(s) 608, communication interface(s) 610, robot model(s) 612, height controller(s) 614, and gait controller(s) 616. Note that the robotic device 600 is shown for illustration purposes and may include additional components and/or have one or more components removed without departing from the scope of the disclosure. For example, the robotic device 600 may include robotic limbs, appendages, legs, feet, actuators, cameras, and/or computing devices, among other possible components. Further, it should be understood that the various components of robotic device 600 may be arranged and connected in any manner Moreover, the above description of processor(s), data storage, program instructions, sensors, and/or communication interface(s) may apply to any discussion below relating to the respective component being used in another system or arrangements. For instance, as noted, FIG. 6 (among other possible figures) illustrates processors, data storage, program instructions, sensors, and/or communication interface(s) as being incorporated in another arrangement. These components may thus take on the same or similar characteristics (and/or form) as the respective components discussed above in association with FIG. 1. However, the components at issue could also take on other characteristics (and/or form) without departing from the scope of the disclosure.

The robot model(s) 612 may include one or more representations of the robotic device 600. A model may represent the robotic device—including its mass, mass distribution, limbs and other appendages, and/or other aspects of the robotic device—as a simplified system of masses and couplings. A control system may use such a simplified model of the robotic device 600 in order to determine a manner in which to control the robotic device 600. An example control objective may be to maintain a point mass of the model at a particular height. A control system feedback loop may estimate the height of the point mass using the model of the robotic device 600 (e.g., based on relationships between the joint angles of the robot and the spatial location of the point mass, and/or based on integrated acceleration measurements recorded over a period of time with a known initial condition). The feedback loop may attempt to regulate the height of the point mass if it deviates from a target height. Once the change in height has been determined, the robot model may be applied in the reverse direction to determine an amount of vertical force for one or more legs of the robotic device 600 to apply against a surface in order to effect the determined height change. Thus, the robot model(s) may include relationships between the simplified model and the state of the robot (e.g., the kinematic state of the robot and/or the joint angles of the robot's actuators).

One example model of a legged robot is a linear inverted pendulum (LIP). The LIP model may represent the legged robot as a point mass located at the robot's center of mass (CoM) affixed to a massless rigid arm, which pivots at a point on the ground referred to as the center of pressure (CoP). In the context of the LIP model, regulating the legged robot's balance involves maintaining the upright position of the point mass. On a flat surface where the robot is stationary, this stable location for the point mass (and therefore the robot's CoM) is directly above the robot's CoP. Thus, balance control of a legged robot may be achieved by either controlling the robot's CoM and/or the robot's CoP.

Another example model is a barbell model. A barbell model may be similar to two LIP models rigidly coupled with a massless rigid arm, such that the two point masses are coupled along the axis defined by the massless rigid arm. Each part of the barbell model (e.g., the spatial location of the point mass) may be defined by one or more relationships between that part of the barbell model and the state of the robot. For example, the mass distribution of the robotic device 600 may be such that a point mass of the barbell model is located at a particular spatial location within the robot's body (e.g., above a pair of legs of the robot). With knowledge of the robot's specific configuration, such as the dimensions of its components, the position of that spatial location within the robot's body may be determined using inverse kinematics applied against the joint angles of the robot. Thus, the location of the point mass of the barbell model may be determined based on the joint angles of the robot's legs.

The robot model(s) 612 may also include "forward" models, which may be used to predict the future state of the robot (e.g., simulating the robot's behavior based on control inputs). Forward models may include similar relationships as described above with respect to the LIP model and the barbell model. Simulating future robot behavior may involve applying control inputs to a model of the robot, estimating the future state after a short period of time (possibly allowing for small angle approximations and linearization), and repeating that estimation for some duration of time into the future. The predicted future state of the robot may serve as a basis for adjusting planned robotic control. For instance, the predicted future state may be "scored," allowing multiple predicted future states resulting from different control inputs to be quantitatively compared. A control input that produces a satisfactory predicted future state may then be selected and carried out by the robotic device 600.

Multiple models may be included within robot model(s) 612, each of which may correspond to one or more controllers. Each controller may define an aspect of a robot's behavior. Collectively, one or more controllers may represent a "gait" of the robot, such as walking, trotting, galloping, or bounding, among other possible gaits. In some instances, a particular gait may be carried out by the robot with a simple model, such as the LIP model, while another gait may benefit from a more complex model, such as the barbell model. Thus, the particular model from robot model(s) 612 may be selected based on the instructed behavior of the robot.

Note that, as described herein, a "gait" may refer to any combination of controllers that collectively carries out a particular stepping behavior. To execute a gait, a robot may use a combination of timing controllers, height controllers, and footstep location controllers. For example, a galloping gait may use galloping timing, two height controllers (one for the front legs, another for the rear legs), and at least one footstep location controller. In some instances, a gait might define some of the robot's behavior, while other aspects of its behavior (e.g., height control) is performed independent from the gait.

The height controller(s) 614 may include any combination of controllers for regulating the height of the robotic device 600. The height controller(s) 614 may include relationships between an amount of vertical force applied by the legs of the robot and the height of the robotic device. Multiple height controllers within height controller(s) 614 may be the same or similar, but are applied to different pairs of legs. For example, one height controller might apply to the front legs of the robot, while another similar height controller applies to the rear legs of the robot.

The gait controller(s) 616 may combination of hardware and/or software controllers that collectively cause the robot to behave according to a particular kind of stepping behavior. Some gait controllers might operate without accounting for the height of the robot's body; in such instances, the height controller(s) 614 may regulate the height of the robot's body, while the gait controller causes the robot to step according to a specified stepping behavior. A gait controller might include components for roll control, lateral movement control, longitudinal movement control, and/or yaw control.

Longitudinal movement control might involve determining longitudinal displacement that satisfies (or approaches) a target velocity. Lateral movement control might involve determining lateral displacement that balances the robot, steers the robot, avoids an obstacle, and/or otherwise accomplishes a control goal of the robot.

The robotic device 600 may also include additional controllers, such as roll controllers, yaw controllers, footstep planning controllers, controllers for recovering from a slip or loss of balance, controllers for appendages (e.g., a robotic arm) coupled to the robot, and/or controllers for other components of the robot.

VI. EXAMPLE DETERMINATION OF FOOTSTEP LOCATIONS

Once the footstep force values and timing have been determined, a control system may determine locations on a surface at which to place the robot's feet. In some implementations, footstep location determination may be carried out for two dimensions (e.g., 2D coordinates on the surface that the robot is stepping) simultaneously. In other implementations, footstep location determination may involve determining lateral footstep displacement and longitudinal footstep displacement separately, then combining them to form the footstep locations.

In some implementations, determining the footstep locations may involve using a model of the robot to estimate the robot's future state—including its position and velocity—based on predetermined footstep locations (e.g., as defined in a template footstep sequence). As one example, the robot's behavior resulting from a single future step may be simulated, and the robot's position, velocity, balance, and other aspects of the robot's state may be predicted immediately after the robot's foot steps down at that single future step. This process may be repeated for a plurality of future steps at different spatial locations (each of which may correspond to a respective robot leg), such that a plurality of estimated future states is determined. Then, the estimated future states may be evaluated against costs and constraints in order to determine a "score" associated with each future footstep. The resulting scores may be compared against each other and/or a threshold score in order to select a satisfactory score. The robot may then be instructed to step toward the footstep location associated with the selected score.

The cost and constraint analysis described above may involve designating linear constraints and quadratic costs, and executing a linear programming operation to determine an optimal, sub-optimal, or satisfactory footstep location. Some example costs include final position error, target step locations, lateral stepout displacement, target body velocity, extent of acceleration, amount of contact forces applied against a surface, and relative foot placement, among other possible costs. Some example constraints include a maximum lateral stepout (the furthest lateral displacement possible limited by the robot's physical dimensions), a maximum body velocity (to prevent exceeding joint velocity limits), and illegal step regions (e.g., stepping onto a deep body of water, stepping onto a crevice or hole in the surface, etc.), among other possible constraints. The estimated future states of the robot may be applied to the costs and constraints, and a solver or other computational tool may be utilized in order to determine the scores. The costs and constraints may generally be referred to herein as "criteria."

In some implementations, determining a longitudinal displacement for a pair of legs of a robot involves obtaining two or more potential longitudinal displacements and evaluating them to obtain two or more respective scores. One or more constraints—each of which may indicate a limitation of the robot or its components—may serve as a basis (or a partial basis) for determining a score for each potential longitudinal displacement. In some instances, a constraint may represent a maximum condition or limitation that, if exceeded, cannot be carried out by the robot.

Additionally, the potential longitudinal displacements may be scored based on one or more criteria (e.g., cost functions, loss functions, objective functions, reward functions, etc.). A criterion may be, for example, a relationship between the value of the longitudinal displacement and a score. For example, if a robot's control system is designed to slow the robot from a forward velocity to zero velocity (e.g., from walking to standing), a criterion (e.g., cost) might penalize longitudinal displacement values as those displacement values move farther in front of the robot (which would not slow down the robot). In this manner, the score might quantitatively indicate the extent to which the longitudinal displacement accomplishes the goal of slowing down the robot to a stop.

In some instances, a score might be determined based on a cost that considers aspects of the robot other than the longitudinal displacement, or in addition to the longitudinal displacement. For example, a target body velocity might be achieved by stepping along longitudinal displacement footstep locations at a particular cadence or rate (since velocity is displacement per unit time). Thus, a criterion might be a relationship that correlates a longitudinal displacement and footstep timing to a score or penalty value, since the velocity of the robot can be predicted based on the longitudinal displacement and footstep timing. The penalty may be proportionate to the extent of deviation from a target velocity.

A score might be considered to satisfy a criterion if that score is below (or above) a threshold score. In some implementations, a score might be considered to satisfy a criterion if that score is the lowest (or highest) score from among the plurality of determined scores.

The control system may then select a particular longitudinal displacement from among the potential longitudinal displacements that is both within the limitations defined by the constraints (e.g., does not violate any constraints) and satisfies one or more criteria.

VII. EXAMPLE METHODS

Figure 7:
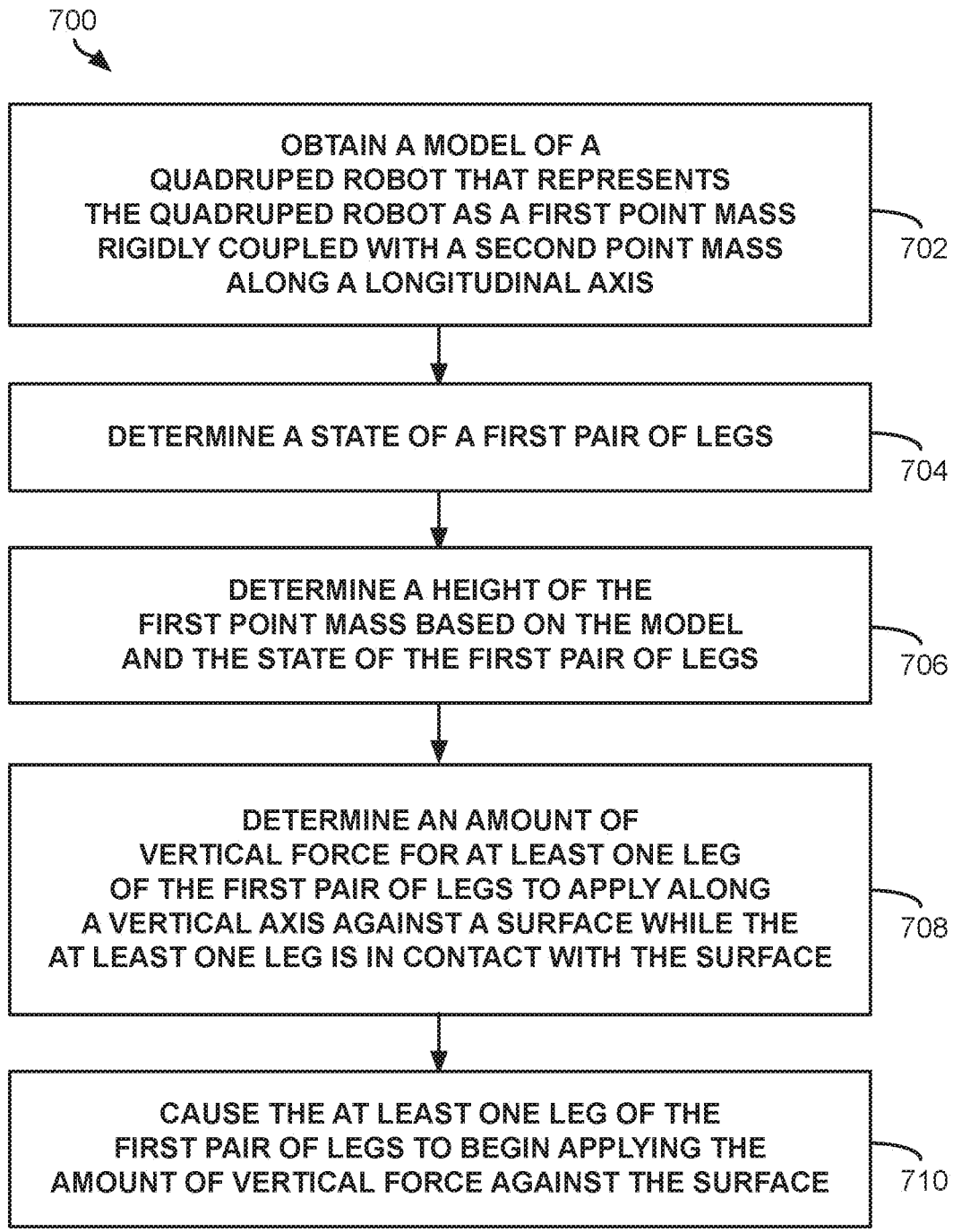
FIG. 7 is a flowchart, according to an example implementation.

FIG. 7 is a flowchart of operations 700 for controlling robots with non-constant body pitch and height, according to an example implementation. Operations 700 may include one or more actions as illustrated by blocks 702-710. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 700 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one of more blocks in FIG. 7 may represent circuitry that is wired to perform the specific logical operations.

A. Obtain a Model of a Quadruped Robot that Represents the Quadruped Robot as a First Point Mass Rigidly Coupled with a Second Point Mass Along a Longitudinal Axis Block 702 involves obtaining a model of a quadruped robot that represents the quadruped robot as a first point mass rigidly coupled with a second point mass along a longitudinal axis. The first point mass may be associated with a first pair of legs (e.g., the front pair of legs), and the second point mass may be associated with a second pair of legs (e.g., the rear pair of legs). Each point mass may include properties of the robot, including a mass value, a spatial location with respect to a reference location on the robot, and/or relationships between the spatial location of the point mass and the state of the robot. The model may, for example, be a barbell model that decouples height control of the first pair of legs from height control of the second pair of legs.

The model may be stored on a storage device coupled to the robot or separate from the robot. For example, the model may be stored as data on a storage device of the robot, such as a memory device, hard disk drive, or solid state drive. Obtaining the model may involve retrieving the model from such a storage device and copying it into a temporary memory space, from which a program or control process may access the model.

In some instances, the model may be stored externally from the robot (e.g., on a computing device or server accessible to the robot via a network connection). In such instances, a processor on the robot may transmit a request to the external storage device to retrieve the model. The external storage device may then provide a copy of the model to the robot.

B. Determine a State of a First Pair of Legs

Block 704 involves determining a state of a first pair of legs. The state of the first pair of legs may include information about its kinematic state at a particular point in time and/or information about its posture, pose, joint angles, and/or actuator positions. As described herein, the "kinematic state" may refer to the translational position, translational velocity, translational acceleration, angular position, angular velocity, and/or angular acceleration of a robot (or a portion of the robot).

The state of the first pair of legs may be determined based on the output of one or more sensors on the robot. For example, some sensors—such as accelerometers and gyroscopes—might capture inertial measurements over a period of time, from which the kinematic state may be derived. As another example, sensors coupled to the robot's joints and/or actuators may measure the extent to which various joints are bent and the positions of various components on the robot, from which the robot's "pose" can be determined.

In some implementations, a separate processing device may receive sensor measurements and determine therefrom the state of the robot, which it then provides to the control system carrying out the operations 700. In other implementations, the control system carrying out the operations 700 may process the sensor measurements and estimate the state of the robot based on those measurements. Such state estimation may involve applying sensor measurements to one or more models of the robot, which relate the sensor measurements to a kinematic state of the robot and/or a pose of the robot.

C. Determine a Height of a First Point Mass Based on the Model

Block 706 involves determining a height of the first point mass based on the model and the state of the first pair of legs. In some implementations, the model of the robot may include therein a relationship between aspects of the state of the first pair of legs and the height of the first point mass. For instance, the joint angles of the first pair of legs may be used to determine a distance between the feet of the first pair of legs and the body of the robot (e.g., using inverse kinematics). The joint angles and/or sensors coupled to the robot's legs may indicate an angle of the leg with respect to the body or with respect to the ground. On the basis of the leg angle and amount of extension, a height of the first point mass may be determined.

Other relationships may correlate aspects of the state of the robot with the height of the first point mass. It should be understood that such relationships may depend on the particular configuration of the robot, and that the scope of the present disclosure is not limited to the example relationship described above.

D. Determine an Amount of Vertical Force for at Least One Leg of a First Pair of Legs to Apply Along a Vertical Axis Against a Surface while the at Least One Leg is in Contact with the Surface Block 708 involves determining, by a first height controller for the first point mass, an amount of vertical force for at least one leg of the first pair of legs to apply along a vertical axis against a surface while the at least one leg is in contact with the surface. The amount of force and the angle at which to apply that force against a surface may be determined based on the extent to which the determined height at block 706 deviates from a target height.

In some implementations, a predetermined amount of vertical force for the at least one leg to apply against a ground surface may correspond to a target height while the robot is at rest. During operation, various factors may affect the height of the robot (or portions of the robot). For example, if a quadruped robot is bounding, the amount of vertical force for the legs to apply against a ground surface to maintain the target height may be greater than the predetermined amount of vertical force. As another example, if the front portion of the robot is experiencing a downward velocity, the front legs of the robot might apply a greater vertical force against the ground to mitigate that downward velocity.

In some instances, the control system may determine the footstep force to apply against the ground surface as a vector having a direction and a magnitude. For example, the control system may determine an amount of vertical force to apply against the surface (e.g., height control) and an amount of horizontal force to apply against the surface (e.g., roll control), which collectively forms a force vector having both a vertical component and a horizontal component. Such a force vector may indicate an angle for the leg to contact the surface, along with an amount of force to apply against the surface at that angle. Applying this angled force by the legs against the surface may perform both the height control and the roll control simultaneously.

In some implementations, a control system may determine an amount of vertical force that exceeds the capabilities or limitations of the robot. A robot's actuators or components might be capable of exerting a range of forces. If the control system determines an amount of force for a leg of the robot that exceeds a maximum force (or exceeds a threshold force value), the control system may prevent damaging the robot by causing the leg to exert that threshold amount of force. Such threshold force determinations may also be considered during cost and constraint analysis, as described above.

E. Cause the at Least One Leg of the First Pair of Legs to Begin Applying the Amount of Vertical Force Against the Surface Block 710 involves causing the at least one leg of the first pair of legs to begin applying the amount of vertical force against the surface. In some implementations, block 710 may involve transmitting instructions to a separate processor or control system of the robot. In other implementations, block 710 involves controlling actuators coupled to the at least one leg of the first pair of legs which operate the leg to begin applying the amount of vertical force against the surface.

Operations 700 might also include steps for determining footstep timing and/or footstep location, and causing the robot to step in accordance with the determined timing and locations.

VIII. EXAMPLE COMPUTER-READABLE MEDIUM

Figure 8:
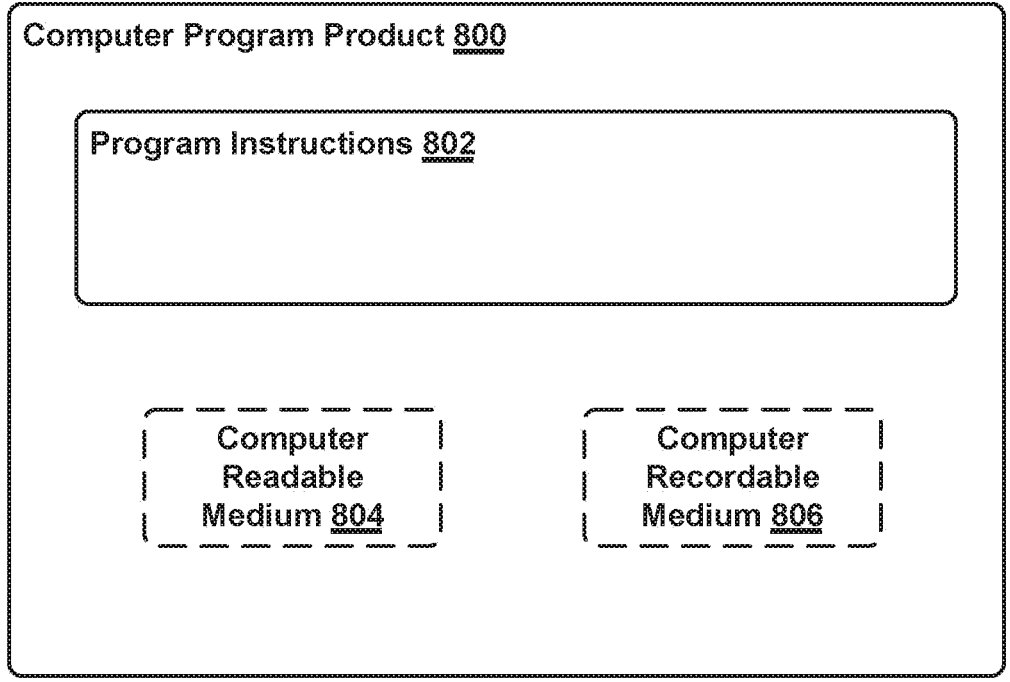
FIG. 8 is a block diagram of an example computer-readable medium, according to an example implementation.

FIG. 8 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 8 is a schematic illustrating a conceptual partial view of a computer program product that includes a computer program for executing a computer process on a computing device, arranged according to at least some implementations disclosed herein.

In some implementations, the example computer program product 800 may include one or more program instructions 802 that, when executed by one or more processors may provide functionality or portions of the functionality described above with respect to FIGS. 1-8. In some examples, the computer program product 800 may include a computer-readable medium 804, such as, but not limited to, a hard disk drive, a Compact Disc (CD), a Digital Video Disk (DVD), a digital tape, memory, etc. In some implementations, the computer program product 800 may include a computer recordable medium 806, such as, but not limited to, memory, read/write (R/W) CDs, R/W DVDs, etc.

The one or more program instructions 802 can be, for example, computer executable and/or logic implemented instructions. In some examples, a computing device is configured to provide various operations, or actions in response to the program instructions 802 conveyed to the computing device by the computer readable medium 804 and/or the computer recordable medium 806. In other examples, the computing device can be an external device in communication with a device coupled to the robotic device.

The computer readable medium 804 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 800 can implement operations discussed in reference to FIGS. 1-7.

IX. CONCLUSION

It should be understood that arrangements described herein are for purposes of example only. As such, other arrangements and other elements (e.g. machines, interfaces, operations, orders, and groupings of operations, etc.) can be used instead, and some elements may be omitted altogether. Further, many of the elements that are described may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robot comprising:
   a body having a front portion and a rear portion, the front portion of the body comprising front legs, and the rear portion of the body comprising rear legs;
   a timing and force controller in communication with the body, the timing and force controller configured to perform operations comprising:
      receiving a state of the front legs and a template footstep sequence, the state of the front legs comprising kinematic information about the front legs, and the template footstep sequence defined by a gait being executed by the robot and comprising footstep force values predetermined for each footstep of the gait being executed by the robot;
      receiving a current height for the front portion of the body and a target height for the front portion of the body;
      modifying the footstep force values to generate a modified footstep sequence based on the template footstep sequence when the current height for the front portion of the body fails to satisfy the target height for the front portion of the body, the modified footstep force values maintaining a threshold height of the rear portion of the robot; and
      communicating the modified footstep sequence; and
   a displacement controller in communication with the timing and force controller and the body, the displacement controller configured to perform operations comprising:

receiving the modified footstep sequence from the timing and force controller; and moving at least one of the front legs or the rear legs of the body based on the modified footstep sequence.

2. The robot of claim 1, wherein the operations of the timing and force controller further comprise:

receiving a state of the rear legs, the state of the rear legs comprising kinematic information about the rear legs;

receiving a current height for the rear portion of the body and a target height for the rear portion of the body; and modifying the footstep force values to generate the modified footstep sequence when the current height for the rear portion of the body fails to satisfy the target height for the rear portion of the body, the modified footstep force values maintaining a threshold height of the front portion of the body.

3. The robot of claim 2, wherein the displacement controller comprises a longitudinal displacement controller, the longitudinal displacement controller configured to perform operations comprising:

determining a longitudinal displacement for the front legs and the rear legs of the body based on the modified footstep sequence; and moving both the front legs and the rear legs of the body according to the determined longitudinal displacement.

4. The robot of claim 1, wherein the displacement controller comprises a lateral displacement controller, the lateral displacement controller configured to perform operations comprising:

determining lateral step-out displacement values for at least one of the front legs or the rear legs of the body based on the modified footstep sequence; and moving the at least one of the front legs or the rear legs of the body according to the determined lateral step-out displacement values.

5. The robot of claim 1, wherein the operations of the timing and force controller further comprise:

receiving a timing for at least one of the front legs or the rear legs of the body corresponding to the template footstep sequence; and modifying the timing for the at least one of the front legs or the rear legs of the body based on an elevation of a leg contact surface; and communicating the modified timing as part of the modified footstep sequence.

6. The robot of claim 1, wherein modifying the footstep force values to generate the modified footstep sequence when the current height for the front portion of the body fails to satisfy the target height for the front portion of the body further comprises:

when the current height for the front portion of the body is less than the target height for the front portion of the body, modifying the footstep force values by increasing vertical forces for the front legs in the footstep sequence; and when the current height for the front portion of the body is greater than the target height for the front portion of the body, modifying the footstep force values by decreasing vertical forces for the front legs in the footstep sequence.

7. The robot of claim 1, wherein the timing and force controller is configured as a vertical force controller.

8. The robot of claim 1, wherein the template footstep sequence defines footstep locations, each footstep location corresponding to a planar coordinate comprising a lateral displacement and a longitudinal displacement with respect to the body, the longitudinal displacement corresponding to a longitudinal axis defined along the body from the front portion to the rear portion, the lateral displacement corresponding to a lateral axis perpendicular to the longitudinal axis and associated with side to side motion of the body.

9. The robot of claim 1, wherein the kinematic information about the front legs comprises at least one of information about movement of the front legs, a pose of the front legs, forces acting on the front legs, joint angles of the front legs, or kinematic information corresponding to the body with respect to the front legs.

10. The robot of claim 9, wherein the kinematic information corresponding to the body comprises at least one of position, velocity, acceleration, angular position, angular velocity, or angular acceleration.

11. A method comprising:

receiving, at data processing hardware, a state of front legs of a robot and a template footstep sequence for the robot, the robot comprising a body having a front portion and a rear portion, the front portion of the body comprising the front legs, the rear portion of the body comprising rear legs, the state of the front legs comprising kinematic information about the front legs, and the template footstep sequence defined by a gait being executed by the robot and comprising footstep force values predetermined for each footstep of the gait being executed by the robot;

receiving, at the data processing hardware, a current height for the front portion of the body and a target height for the front portion of the body;

modifying, by the data processing hardware, the footstep force values to generate a modified footstep sequence based on the template footstep sequence when the current height for the front portion of the body fails to satisfy the target height for the front portion of the body, the modified footstep force values maintaining a threshold height of the rear portion of the robot; and instructing, by the data processing hardware, movement of at least one of the front legs or the rear legs of the robot based on the modified footstep sequence.

12. The method of claim 11, further comprising:

receiving, at the data processing hardware, a state of the rear legs, the state of the rear legs comprising kinematic information about the rear legs;

receiving, at the data processing hardware, a current height for the rear portion of the body and a target height for the rear portion of the body; and modifying, by the data processing hardware, the footstep force values to generate the modified footstep sequence when the current height for the rear portion of the body fails to satisfy the target height for the rear portion of the body, the modified footstep force values maintaining a threshold height of the front portion of the robot.

13. The method of claim 12, further comprising:

determining, by the data processing hardware, a longitudinal displacement for the front legs and the rear legs based on the modified footstep sequence; and instructing, by the data processing hardware, movement of both the front legs and the rear legs of the robot according to the determined longitudinal displacement.

14. The method of claim 11, further comprising:

determining, by the data processing hardware, lateral step-out displacement values for at least one of the front legs or the rear legs based on the modified footstep sequence; and instructing, by the data processing hardware, movement of the at least one of the front legs or the rear legs of the robot according to the determined lateral step-out displacement values.

15. The method of claim 11, further comprising:
receiving, at the data processing hardware, a timing for at least one of the front legs or the rear legs corresponding to the template footstep sequence; and
modifying, by the data processing hardware, the timing for the at least one of the front legs or the rear legs based on an elevation of a leg contact surface; and
associating, by the data processing hardware, the modified timing with the modified footstep sequence.

16. The method of claim 11, wherein modifying the footstep force values to generate the modified footstep sequence when the current height for the front portion of the body fails to satisfy the target height for the front portion of the body further comprises:
when the current height for the front portion of the body is less than the target height for the front portion of the body, modifying the footstep force values by increasing vertical forces for the front legs in the footstep sequence; and
when the current height for the front portion of the body is greater than the target height for the front portion of the body, modifying the footstep force values by decreasing vertical forces for the front legs in the footstep sequence.

17. The method of claim 11, wherein the data processing hardware is associated with a timing and force controller configured to generate the modified footstep sequence and a displacement controller configured to move at least one of the front legs or the rear legs of the robot based on the modified footstep sequence.

18. The method of claim 11, wherein the template footstep sequence defines footstep locations, each footstep location corresponding to a planar coordinate comprising a lateral displacement and a longitudinal displacement with respect to the body of the robot, the longitudinal displacement corresponding to a longitudinal axis along the body of the robot from the front portion to the rear portion, the lateral displacement corresponding to a lateral axis perpendicular to the longitudinal axis and associated with side to side motion of the robot.

19. The method of claim 11, wherein the kinematic information about the front legs comprises at least one of information about movement of the front legs, a pose of the front legs, forces acting on the front legs, joint angles of the front legs, or kinematic information corresponding to the body of the robot with respect to the front legs.

20. The method of claim 19, wherein the kinematic information corresponding to the body comprises at least one of position, velocity, acceleration, angular position, angular velocity, or angular acceleration.

\* \* \* \* \*